United States Patent [19]
Kranich

[11] Patent Number: 5,900,022
[45] Date of Patent: May 4, 1999

[54] APPARATUS AND METHOD FOR REDUCING THE CACHE MISS PENALTY IN A VIRTUAL ADDRESSED MEMORY SYSTEM BY USING A SPECULATIVE ADDRESS GENERATOR AND AN ACCURATE ADDRESS GENERATOR

[75] Inventor: Uwe Kranich, Munich, Germany

[73] Assignee: Advanced Micro Devices, Inc., Sunnyvale, Calif.

[21] Appl. No.: 08/922,923

[22] Filed: Sep. 3, 1997

Related U.S. Application Data

[63] Continuation of application No. 08/630,837, Apr. 10, 1996, which is a continuation of application No. 08/199,098, Feb. 22, 1994, abandoned.

[51] Int. Cl.$^6$ .................................................... G06F 12/08
[52] U.S. Cl. ............................................ 711/205; 711/213
[58] Field of Search ................................ 711/1, 3, 202, 711/203, 206, 207, 208, 209, 213, 205

[56] References Cited

U.S. PATENT DOCUMENTS

| 4,400,774 | 8/1983 | Toy | 364/200 |
|---|---|---|---|
| 5,305,444 | 4/1994 | Becker et al. | 395/400 |
| 5,392,410 | 2/1995 | Liu | 395/400 |

FOREIGN PATENT DOCUMENTS

| 0 395 835 A2 | 1/1990 | European Pat. Off. . |
|---|---|---|
| 0 395 835 | 11/1990 | European Pat. Off. . |
| 0 431 463 | 6/1991 | European Pat. Off. . |
| 0 431 463 A2 | 6/1991 | European Pat. Off. . |

OTHER PUBLICATIONS

Patterson et al., *Computer Architecture A Quantitative Approach*, Morgan Kaufmann Publishers, Inc., 1990, pp. 432–438, 454–474.

White, et al, "How Computers Work, A Detailed Look at What's Going on Inside Your PC and Peripherals," PC/Computing, Feb. 1993, pp. 282–309.

International Search Report EP 95 30 0714 dated Jun. 07, 1995.

White, et al, "RAM Cache—Speedy Memory on the Motherboard Makes Standard RAM Seem Even Faster" PC/Computing, Mar. 1993, pp. 262–270.

Power PC 601 RISC Microprocessor User's Manual, Motorola Inc., 1993, pp. 1–7 though 1–8, 1–28, 6–1 through 6–16.

Computer Architecture A Quantitative Approach (1990), Patterson et al, San Mateo, pp. 432–460, published by Morgan Kaufmann Publishers, Inc., California.

*Primary Examiner*—Eddie P. Chan
*Assistant Examiner*—Kevin Verbrugge
*Attorney, Agent, or Firm*—Conley, Rose & Tayon, PC; B. Noel Kivlin

[57] ABSTRACT

An apparatus and method for reducing the cache miss penalty in a virtual memory system is provided. The virtual memory system includes a processor core which generates virtual addresses and a cache configured to supply information in response to receipt of physical addresses. The apparatus includes a logical-to-physical translation unit which converts the virtual addresses generated by the processor core to physical addresses. The logical-to-physical translation unit includes an accurate translation unit, a speculative translation unit, and a comparing unit. The accurate translation unit accurately converts logical addresses to physical addresses. The speculative translation unit generates and transmits a speculative physical address to the cache before the accurate translation unit completes generation of the accurate physical address. When the accurate translation unit completes generation of the accurate physical address, the comparing unit compares the accurate physical address with the speculative physical address. If the accurate physical address does not match the speculative physical address, the transmission of the speculative physical address to the cache is aborted, and the accurate physical address is transmitted to the cache.

34 Claims, 2 Drawing Sheets

APPARATUS AND METHOD FOR REDUCING THE CACHE MISS PENALTY IN A VIRTUAL ADDRESSED MEMORY SYSTEM BY USING A SPECULATIVE ADDRESS GENERATOR AND AN ACCURATE ADDRESS GENERATOR

This application is a continuation of application Ser. No. 08/630,837, filed Apr. 10, 1996, which is a continuation of application Ser. No. 08/199,098, filed Feb. 22, 1994 now abandoned.

BACKGROUND OF THE INVENTION

The present invention relates to a method and apparatus for decreasing the average time required to retrieve information required by a processor, and more particularly to an apparatus and method for reducing the cache miss penalty in a caching system by generating a speculative physical address in parallel with the translation of a virtual address to a physical address.

One way to increase the performance of a computer system is to decrease the time required to supply a microprocessor with the information it requires Such information, which may include both data and instructions, is typically stored in a memory connected to the microprocessor. To access required information, the microprocessor transmits to the memory an address which corresponds to the physical location in the memory (the "physical address") in which the required information is stored In response, the memory transmits back to the microprocessor the information stored in the memory location designated by the physical address.

The time required to supply a microprocessor with required information may be decreased by decreasing the time lapse between the memory's receipt of the physical address and the transmission of the required information This time lapse is determined by the "speed" of the memory. Unfortunately, the cost of memory increases dramatically with the speed of the memory. Thus, it is rarely practical to use the fastest memory available, especially in systems which require large quantities of memory.

Consequently, it has been discovered that by using a relatively small bank of relatively high-speed memory ("cache memory") as a buffer for a larger bank of slower memory ("system memory"), the average information-request to information-supply speed can be greatly improved. Specifically, in a system having a cache memory (a "cache system"), the microprocessor initially requests information it needs from the cache memory. If the information is stored in the cache memory, the request is said to be a "cache hit" and the information is provided to the microprocessor from the cache memory at the faster rate. If the required information is not stored in the cache memory, the information request is said to be a "cache miss" and the information is retrieved from the system memory at the slower transfer rate. When the information is supplied to the microprocessor from the system memory, a copy of the information is typically stored in the cache memory in anticipation of subsequent requests for the same information. The computational efficiency lost due to a cache miss is referred to herein as the "cache miss penalty."

Many modern computer systems are designed to allow software to address "virtual memory" using "virtual addresses", rather than the actual memory on the system using physical addresses. In a system that supports virtual memory (a "virtual memory system"), the software is allowed to assume that the process it implements may access the system's entire address space, that the memory is contiguous, and that the memory begins at a particular address. Due to these assumptions, the software need not be aware of the actual configuration or usage of the system's memory. Virtual memory systems and the benefits thereof are described in detail by David A. Patterson and John L. Hennessy in *Computer Architecture A Quantitative Approach* (1990), published by Morgan Kaufmann Publishers, Inc. San Mateo, Calif., pages 432–454.

In virtual memory systems, information must still be stored in the actual system memory. Thus, virtual memory systems must provide a mechanism for translating the virtual addresses generated by the software into physical addresses corresponding to actual memory locations of the system memory. One mechanism commonly used to perform this translation is a translation-lookaside buffer. The concept of translation-lookaside buffers is generally well-known in the art, and is described in detail by David A. Patterson and John L. Hennessy in *Computer Architecture A Quantitative Approach* (1990), pages 437–438.

Similar to non-virtual memory systems, virtual memory systems may employ caching techniques to decrease the time required to retrieve required information. Virtual memory systems may be designed with cache memories which supply required information in response to physical addresses ("physical-address-indexed caches"), cache memories which supply required information in response to virtual addresses ("virtual-address-indexed caches"), or both. Virtual-address-indexed caches are described in detail by David A. Patterson and John L. Hennessy in *Computer Architecture A Quantitative Approach* (1990), at page 460.

When information is required in a virtual memory system which employs both a physical-address-indexed cache and a virtual-address-indexed cache, a search for the desired information is performed in the virtual-address-indexed cache while the virtual address is translated to a physical address. If the desired information is not present in the virtual-address-indexed cache, the processor awaits the result of a search for the desired information in the physical-address-indexed cache. Such a search is begun only after the process of determining a physical address is completed. Information retrieval from the physical-address-indexed cache is slower then retrieval from the virtual-address-indexed cache since a translation delay is imposed prior to the search of the physical-address-indexed cache. Thus, a cache miss in the virtual-address-indexed cache results in a cache miss penalty.

In light of the foregoing, in a virtual memory system having a virtual-address-indexed cache and a physical-address-indexed cache, a method and apparatus for reducing the cache miss penalty caused by a cache miss of the virtual-address-indexed cache is clearly desirable Further, it is clearly desirable to provide an apparatus and method for avoiding the logical-to-physical address translation time for at least some cache information retrievals from the physical-address-indexed cache.

SUMMARY OF THE INVENTION

According to one aspect of the present invention, an apparatus for use in a virtual memory system for reducing the delay between generation of a virtual address by a processor core and transmission to a memory of a physical address corresponding to the virtual address is provided. The generation of the virtual address by the processor core effects a request for required information. The apparatus includes a translation lookaside buffer operatively connected with the processor core and the memory for receiving the virtual address and generating an accurate physical address, and a speculative address generating means operatively connected with the translation lookaside buffer and the memory for generating a speculative address. The speculative address generating means transmits the speculative address to the memory prior to the translation lookaside buffer generating the accurate physical address. The apparatus further includes comparing means, operatively connected with the translation lookaside buffer, the memory and the speculative address generating means, for comparing the accurate physical address with the speculative address. The comparing means transmits the accurate physical address to the memory when the accurate physical address does not match the speculative address.

According to another aspect of the present invention, an apparatus for reducing the time required for a processor core in a virtual memory system to retrieve information from a memory configured to supply information in response to a physical address is provided. The apparatus generally includes accurate physical address generating means, operatively connected with the processor core and the memory, for receiving a virtual address corresponding to an accurate physical address and for generating the accurate physical address. The apparatus further includes speculative address generating means, operatively connected with the memory, for generating a speculative physical address prior to the accurate physical address generating means generating the accurate physical address. The speculative address generating means transmits the speculative physical address to the memory to initiate a first lookup operation in the memory based on the speculative physical address. The apparatus further includes comparing means operatively connected with the accurate physical address generating means, the memory and the speculative address generating means for receiving the accurate physical address from the accurate physical address generating means and receiving the speculative physical address from the speculative address generating means. The comparing means compares the accurate physical address with the speculative physical address and transmits the accurate physical address to the memory to initiate a second lookup operation based on the accurate physical address when the accurate physical address is different from the speculative physical address.

According to another aspect of the inventions a logical-to-physical address translation unit for transmitting a physical address over a bus in response to a virtual address is provided. The logical-to-physical address translation unit includes accurate translation means for receiving the virtual address and translating the virtual address to an accurate physical address, and speculative translation means, operatively connected with the accurate translation means, for generating a speculative physical address. The logical-to-physical address translation unit further includes comparing means operatively connected with the accurate translation means, the speculative translation means and the bus, for transmitting the speculative physical address as the physical address over the bus prior to completion of the generation of the accurate physical address, for comparing the accurate physical address with the speculative physical address, and for aborting transmission of the speculative physical address over the bus and initiating transmission of the accurate physical address over the bus when the accurate physical address does not match the speculative physical address.

According to yet another aspect of the invention, a virtual memory system is provided. The virtual memory system includes a processor core disposed to generate a virtual address representative of required information and a first cache disposed to supply information in response to virtual addresses. The first cache is operatively connected with the processor core for receiving the virtual address from the processor core. The first cache includes a first plurality of storage locations for storing information. The first cache, in response to receipt of the virtual address, transmits the required information to the processor core when the required information resides in the first plurality of storage locations. The virtual memory system further includes a logical-to-physical address translation means, operatively connected with the processor core, for receiving the virtual address, for generating a physical address in response to the virtual address, and for transmitting the physical address, and a second cache disposed to supply information in response to physical addresses. The second cache is operatively connected with the logical-to-physical translation means and to the processor core, for receiving the physical address from logical-to-physical translation means. The second cache includes a second plurality of storage locations for storing information. The second cache initiates a lookup operation for the required information in response to receipt of the physical address. The second cache transmits the required information to the processor core when the required information resides in the second plurality of storage locations.

The logical-to-physical translation means includes accurate translation means for receiving the virtual address and translating the virtual address to an accurate physical address and speculative translation means, operatively connected with the accurate translation means, for generating a speculative physical address. The logical-to-physical address translation means further includes comparing means operatively connected with the accurate address generating means, the speculative address generating means and the second cache, for transmitting the speculative physical address as the physical address to the second cache prior to completion of the generation of the accurate physical address, for comparing the accurate physical address to the speculative physical address, and for aborting transmission of the speculative physical address to the second cache and initiating transmission of the accurate physical address to the second cache when the accurate physical address does not match the speculative physical address.

According to yet another aspect of the invention, a method for converting a virtual address to a physical address in a system including a processor core configured to generate the virtual address to request required information from a memory is provided. The method includes the steps of initiating a conversion operation to convert the virtual address to an accurate physical address, generating a speculative physical address, transmitting the speculative physical address to the memory prior to completion of the conversion operation, and comparing the accurate physical address to the speculative physical address. The method further comprises the steps of terminating the transmission of the speculative physical address to the memory, and initiating transmission of the accurate physical address to the memory, when the accurate physical address does not match the speculative physical address.

BRIEF DESCRIPTION OF THE DRAWINGS

The features of the present invention, which are believed to be novel, are set forth with particularity in the appended claims The invention, together with further objects and advantages thereof, may best be understood by making reference to the following description taken in conjunction with the accompanying drawings, in the several figures of which like reference numerals identify like elements, and wherein:

DETAILED DESCRIPTION OF THE PREFERRED EMBODIMENT

Figure 1:
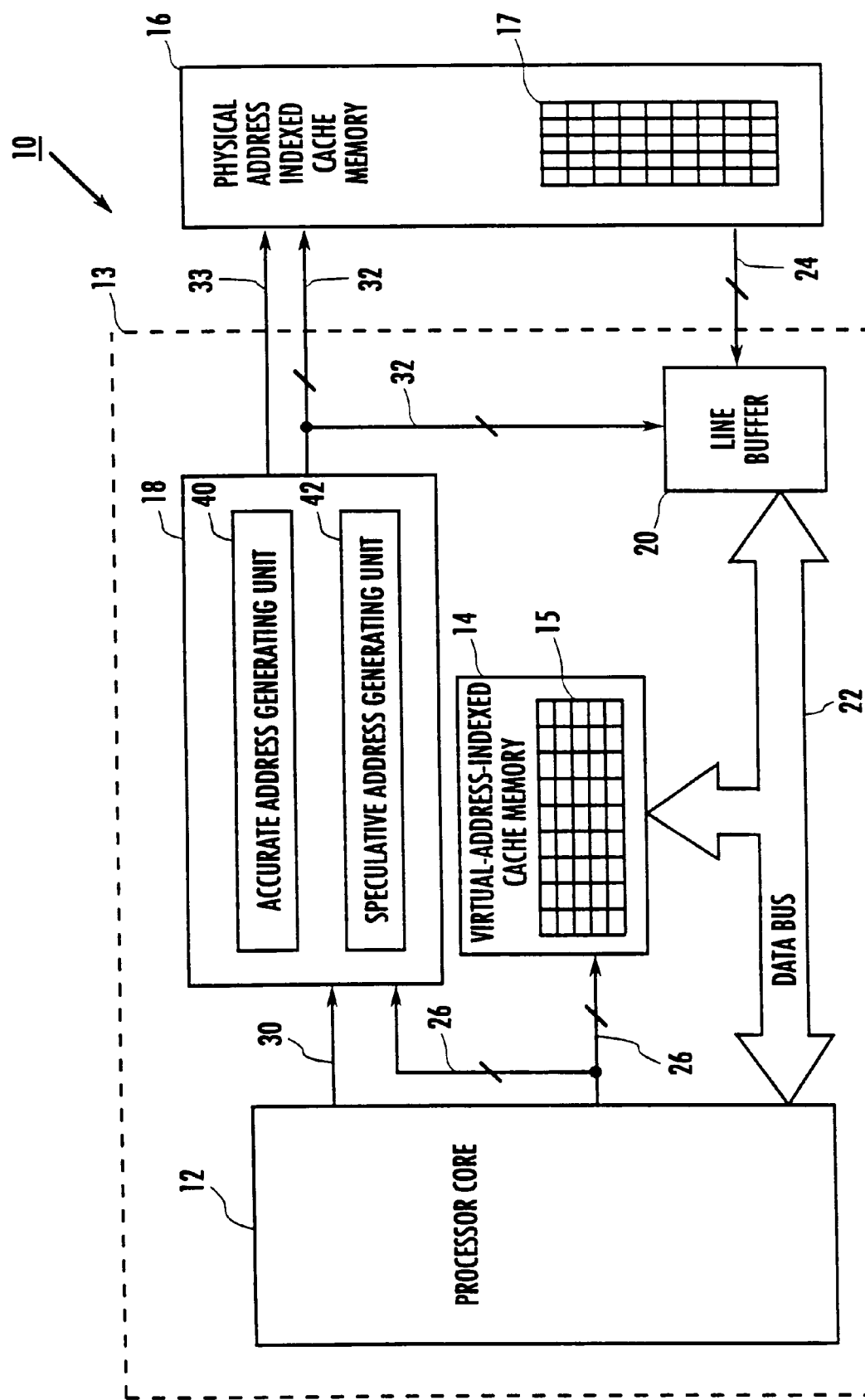
FIG. 1 illustrates in block diagram form a virtual memory system according to the preferred embodiment of the invention.

FIG. 1 illustrates in block diagram form a virtual memory system 10 according to the preferred embodiment of the invention Virtual memory system 10 generally includes a processor core 12, a virtual-address-indexed cache memory 14 a physical-address indexed cache memory 16 and a logical-to-physical translation unit 18.

Processor core 12 generally represents those components in a processor 13 which decode and execute instructions Processor core 12 is coupled to physical-address-indexed cache memory 16 through a line buffer 20 by a plurality of data buses 22 and 24. Processor core 12 is coupled to logical-to-physical translation unit 18 by a virtual address bus 26 and by a required-information status line 30. Processor core 12 is also coupled to virtual-address-indexed cache memory 14 by virtual address bus 26. Since system 10 is a virtual memory system, the instructions executed by processor core 12 refer to logical addresses rather physical addresses When information is required by processor core 12, processor core 12 generates a virtual address identifying the logical location of the required information Processor core 12 further generates a status signal over line 30 indicative of whether the required information is data or an instruction.

Virtual-address-indexed cache memory 14 is internal, residing on processor 13 with processor core 12. Virtual-address-indexed cache memory 14 is coupled to data bus 22 and includes a plurality of storage locations 15. Virtual-address-indexed cache memory 14 is arranged to transmit information stored within its storage locations 15 in response to virtual addresses received from processor core 12 over virtual address bus 26.

Physical-address-indexed cache memory 16 is external, residing exterior to processor 13. Physical-address-indexed cache memory 16 is coupled to logical-to-physical translation unit 18 and line buffer 20 by a physical address bus 32 and a speculative read control line 33. Physical-address-indexed cache memory 16 includes a plurality of storage locations 17 for storing information, and control circuitry for supplying over data bus 24 information stored in storage locations 17. In contrast to virtual-address-indexed cache memory 14, the information within storage locations 17 is supplied by physical-address-indexed cache memory 16 in response to physical addresses.

Since physical-address-indexed cache memory 16 supplies information in response to physical addresses, the virtual addresses generated by processor core 12 must be translated by logical-to-physical translation unit 18 into physical addresses before required information can be retrieved from physical-address-indexed cache memory 16.

The process by which processor core 12 retrieves required information shall now be explained in greater detail. As mentioned above, when processor core 12 requires information, processor core 12 generates a virtual address indicative of the required information. Processor core 12 transmits this virtual address on virtual address bus 26. Both logical-to-physical translation unit 18 and virtual-address-indexed cache memory 14 receive the virtual addresses transmitted by processor core 12 over virtual address bus 26. In response to the receipt of the virtual address, logical-to-physical translation unit 18 begins to translate the virtual address to a physical address Simultaneously, virtual-address-indexed cache memory 14 determines whether the required information currently resides in any of its storage locations 15. If the required data does reside in one of storage locations 15, virtual-address-indexed cache memory 14 transmits the required information to processor core 12 over data bus 22.

If the required data does not reside in any of storage locations 15, logical-to-physical translation unit 18 completes the translation of the virtual address into a physical address, and generates the physical address to physical-address-indexed cache memory 16 over physical address bus 32. Upon receipt of the physical address, physical-address-indexed cache memory 16 performs a search to determine if the required information resides in storage locations 17. If the required information is found, physical address-based cache memory 16 transmits the information to processor core 12 through line buffer 20 over data buses 24 and 22. Virtual-address-indexed cache memory 14 may optionally be configured to read and store the information sent from physical-address-indexed cache memory 16 to processor core 12 into one of its storage locations 15 in anticipation of later requests for the same information.

Logical-to-physical translation unit 18 generally includes an accurate address generating unit 40 and a speculative address generating unit 42. When logical-to-physical translation unit 18 receives a virtual address on virtual address bus 26, accurate address generating unit 40 and speculative address generating unit 42, in parallel, generate physical addresses.

Accurate address generating unit 40 is configured to generate physical addresses that always accurately correspond to the storage locations indicated by the received virtual addresses ("accurate physical addresses") Thus, accurate address generating unit 40 may be, for example, a translation lookaside buffer implemented as commonly known in the art.

The logical-to-physical address translation process implemented by speculative address generating unit 42 differs from that implemented by accurate address generating unit 40 in two significant ways. First, the process implemented by speculative address generating unit 42 need not guarantee that the generated physical address will be accurate. Second, the process implemented by speculative address generating unit 42 must complete the generation of a speculative address in less time than it takes for accurate address generating unit 40 to generate the accurate physical address. As long as these two criteria are met, the specific embodiment of speculative address generating unit 42 may vary. The presently preferred embodiment of speculative address generating unit 42 is responsive to the status signal on line 30, and will be described in greater detail below.

Thus, after logical-to-physical translation unit 18 receives a virtual address, and while accurate address generating unit 40 is determining the accurate physical address, speculative address generating unit 42 completes generation of a speculative address. Logical-to-physical translation unit 18 transmits the speculative address to physical-address-indexed cache memory 16 to initiate a lookup operation based on the speculative address. Logical-to-physical translation unit 18 further transmits a signal over line 33 to indicate that the physical address currently being supplied to physical-address-indexed cache memory 16 is a speculative address.

For example, logical-to-physical translation unit 18 may drive line 33 HIGH when the physical address currently being supplied to physical-address-indexed cache memory 16 is a speculative address.

Accurate address generating unit 40 completes generation of the accurate physical address after the generation of the speculative address, but prior to the completion of the lookup operation based on the speculative address. When accurate address generating unit 40 completes generation of the accurate physical address, logical-to-physical translation unit 18 compares the accurate physical address with the speculative address. If the speculative address is the same as the accurate physical address, then the lookup operation based on the speculative address is allowed to complete. If the required information is found in physical-address-indexed cache memory 16, it is supplied to processor core 12 through line buffer 20 via data buses 24 and 22.

On the other hand, if the accurate physical address is different from the speculative address, logical-to-physical translation unit 18 aborts the transmission of the speculative address over physical address bus 32, begins transmitting the accurate physical address to physical-address-indexed cache memory 16 over physical address bus 32, and transmits a signal over line 33 indicating that the address on bus 32 is not a speculative address. For example, logical-to-physical translation unit 18 may drive line 33 LOW when the physical address currently being supplied to physical-address-indexed cache memory 16 is not a speculative address.

Because the control signal on line 33 changes state when the transmission of the speculative address is aborted and the transmission of the accurate physical address is initiated, the control signal effectively indicates to memory 16 the outcome of the comparison of the speculative address and the accurate physical address. While the control signal on line 33 has been described herein as one which changes states to indicate the outcome of the comparison of the speculative address and the accurate physical address, the specific signal indication used to indicate the comparison outcome may vary.

Upon receipt of the new address on bus 32 and the change in the signal over line 33, the control circuitry of physical-address-indexed cache memory 16 aborts the lookup operation based on the speculative address and initiates a lookup operation based on the accurate physical address. If the required information is found in the physical-address-indexed cache memory 16 it is supplied to processor core 12 through line buffer 20 via data buses 24 and 22.

When the speculative address is inaccurate physical-address-indexed cache memory 16 receives the accurate physical address over physical address bus 32 in substantially the same amount of time it would have taken to generate the accurate address in the absence of speculative address generating unit 42 Hence, no additional delay is imposed by the parallel address generation of speculative address generating unit 42. On the other hands when the speculative address is accurate, the physical-address-indexed cache memory 16 is able to supply processor core 12 with required information faster than is possible in systems which rely exclusively on always-accurate logical-to-physical address translation techniques.

The actual performance increase obtained by operating speculative address generating unit 42 in parallel with accurate address generating unit 40 depends on how quickly and how accurately the process implemented in speculative address generating unit 42 can predict the correct physical address. The presently preferred embodiment of a speculative address generating unit shall now be described in greater detail with reference to FIG. 2.

Figure 2:
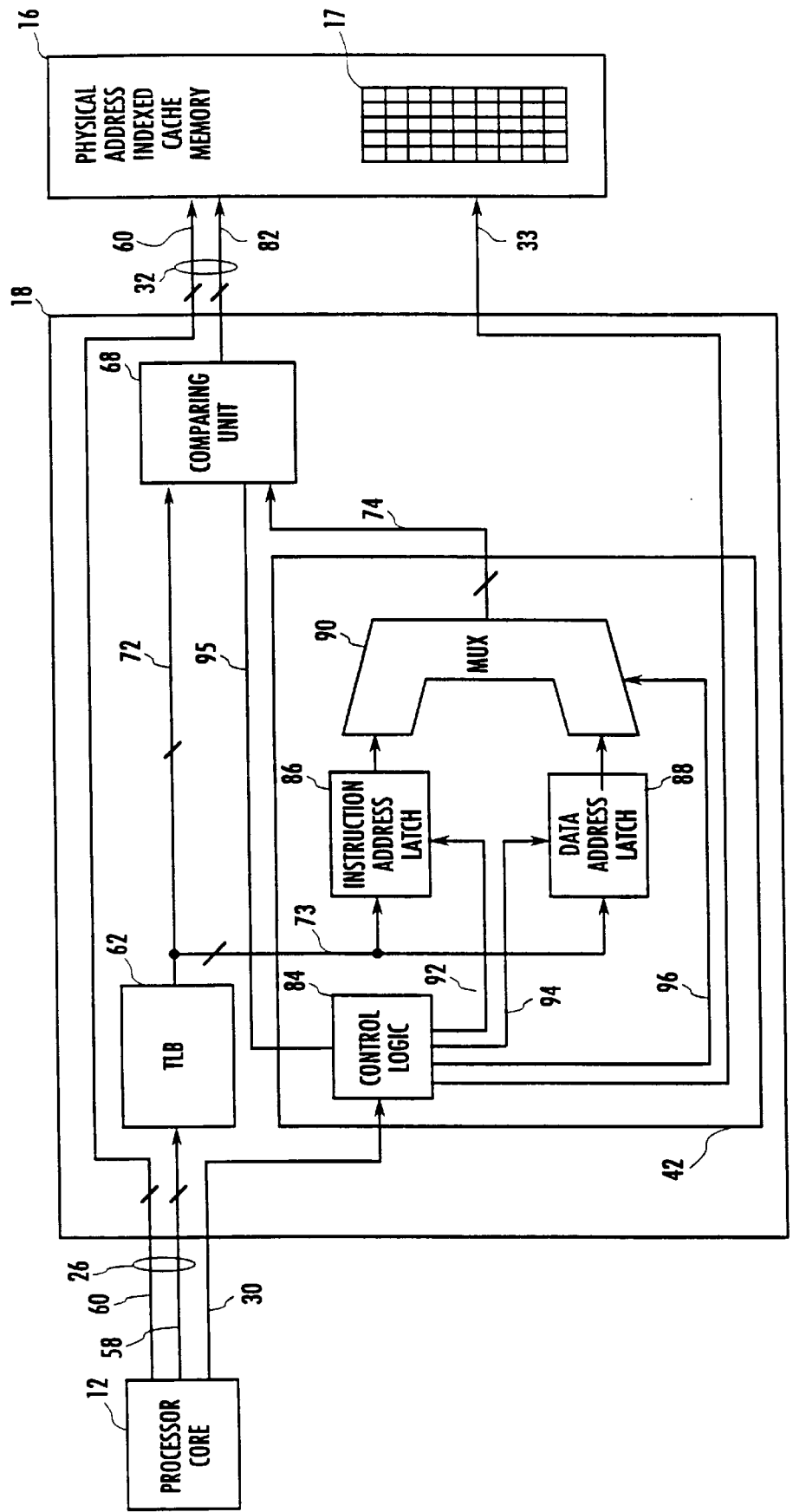
FIG. 2 illustrates in block diagram form the presently preferred embodiment of a logical-to-physical translation unit.

FIG. 2 illustrates in block diagram form the presently preferred embodiment of logical-to-physical translation unit 18. Logical-to-physical translation unit 18 is arranged to work with processor core 12 of a virtual memory system which employs virtual page techniques to implement virtual memory (a "virtual page system"). In virtual page systems, the storage locations in system memory are divided into a plurality of equal-sized groups, called pages. Each page has a physical page address which uniquely identifies the page, and each storage location within each page has a unique offset from its respective physical page address. Thus, information in any given storage location in the system memory may be accessed by sending to the system memory a physical address containing the physical page address and the offset which, together, uniquely identify the designated storage location.

In virtual page systems, software references storage locations in the system memory by virtual addresses which include a virtual page address and an offset. The offset component of a virtual address is identical to the offset component of the physical address of the storage location represented by the virtual address. Therefore, the offset portion of virtual addresses need not be changed during the logical-to-physical address translation process. The virtual page address portion of the virtual address, however, must be translated into the physical page address to which it corresponds before information can be retrieved from the system memory.

Because processor core 12 belongs to a virtual page system, virtual addresses generated by processor core 12 include a logical page address and an offset. Virtual address bus 26 includes a logical page address bus 58 over which the logical page address portion of each virtual address is transmitted to memory 16, and an offset bus 60 over which the offset portion of each virtual address is transmitted to memory 16.

Logical-to-physical translation unit 18 generally includes a translation lookaside buffer 62, speculative address generating unit 42, and a comparing unit 68. Translation lookaside buffer 62 is coupled to processor core 12 by logical page address bus 58. Translation lookaside buffer 62 is also coupled to speculative address generating unit 42 by a bus 73. Speculative address generating unit 42 is further coupled to processor core 12 by line 30. Logical-to-physical translation unit 18 is coupled to physical-address-indexed cache memory 16 by physical address bus 32 which includes physical page address bus 58 coupled to comparing unit 68, and offset bus 60.

Speculative address generating unit 42 generally includes control logic 84, an instruction address latch 86, a data address latch 88, and a multiplexer 90. Control logic 84 is coupled to control line 33, to instruction address latch 86 by a line 92, to data address latch 88 by a line 94, to multiplexer 90 by a line 96, to comparing unit 68 by a line 95, and to processor core 12 by line 30.

The operation of logical-to-physical translation unit 18 shall now be explained in greater detail. Logical-to-physical translation unit 18 receives from processor core 12, over virtual address bus 26, a virtual address which identifies the storage location that holds required information. More specifically, the logical page address corresponding to the required information's physical storage location is transmitted on logical page address bus 58, and the offset corresponding to the required information's physical storage location is transmitted on offset bus 60. Processor core 12 also transmits over line 30 a signal indicating whether the required information represents an instruction or data.

In response to the virtual address, translation lookaside buffer 62 begins converting the logical page address of the virtual address to an accurate physical page address. Simultaneously, speculative address generating unit 42 causes a speculative address to be sent to memory 16 over physical page address bus 58 via comparing unit 68 and a bus 74, and control logic 84 transmits a signal to memory 16 on line 33 to indicate that the physical address on bus 32 is a speculative address. In response to receipt of the speculative address on bus 32 and the signal on line 33, memory 16 initiates a lookup operation based on the speculative address.

When translation lookaside buffer 62 finishes translating the logical page address to an accurate physical page address, translation lookaside buffer 62 transmits the accurate physical page address to the comparing unit 68 over a bus 72. Comparing unit 68 compares the accurate physical page address with the speculative page address. If the accurate physical page address matches the speculative page address, then the comparing unit 68 completes the transmission of the speculative page address over physical page address bus 58 and memory 16 completes the lookup operation based on the speculative address.

If the accurate physical page address does not match the speculative page address, then comparing unit 68 ceases to transmit the speculative page address on physical page address bus 58, sends a signal to control logic 84 over line 95 to indicate that the current speculative page address is not accurate, and begins to transmit the accurate physical page address over physical page address bus 58.

In response to the signal on line 95, control logic 84 transmits a signal on line 33 to indicate that the physical address on bus 32 is no longer a speculative address. Upon receipt of the signal on line 33, memory 16 aborts the lookup operation based on the speculative address and initiates a search based on the accurate physical address.

Speculative address generating unit 42 is configured to generate a speculative page address based on the accurate physical page address most recently generated by translation lookaside buffer 62 for information of the same type as the information that is currently required. For example, if, in response to the last request for an instruction, the translation lookaside buffer 62 generated a physical page address 0, then speculative address generating unit 42 will generate, in response to a request for the retrieval of an instruction, page address 0 as a speculative page address. Similarly, if, in response to the last request for data, the translation lookaside buffer 62 generated physical page address 1, then speculative address generating unit 42 will generate, in response to a request for the retrieval of data, page address 1 as a speculative page address.

Speculative address generating unit 42 implements the above prediction process as follows. After translation lookaside buffer 62 generates an accurate physical page address, translation lookaside buffer 62 transmits the accurate physical page address over bus 73 to instruction address latch 86 and data address latch 88. In response to the signal on line 30, control logic 84 determines whether the accurate physical page address was generated in response to a request for an instruction or a request for data. If the accurate physical page address was generated in response to a request for an instruction, control logic 84 transmits a control signal over line 92 to instruction address latch 86 to cause the accurate physical page address on bus 73 to be latched into instruction address latch 86. On the other hand, if the accurate physical page address was generated in response to a request for data, control logic 84 transmits a control signal over line 94 to data address latch 88 to cause the accurate physical page address on bus 73 to be latched into data address latch 88.

In response to a subsequent request for information, control logic 84 transmits a signal over line 96 to multiplexer 90 to select either instruction address latch 86 or data address latch 88. Specifically, if the signal on line 30 indicates that an instruction is being requested by processor core 12, then control logic 84 transmits a signal over line 96 to multiplexer 90 to cause the page address previously stored in instruction address latch 86 to be transmitted through multiplexer 90 onto bus 74. If the signal on line 30 indicates that data is being requested by processor core 12, control logic 84 transmits a signal over line 96 to multiplexer 90 to cause the page address stored in instruction address latch 86 to be transmitted through multiplexer 90 onto bus 74.

Thus, the preferred embodiment of speculative address generating unit 42 stores the most recently generated actual page address for an instruction request in instruction address latch 86, and the most recently generated actual page address for a data request in data address latch 88. When a request for an instruction is received, speculative address generating unit 42 immediately transmits the contents of instruction address latch 86 as a speculative page address. Likewise, when a request for data is received, speculative address generating unit 42 immediately transmits the contents of data address latch 88 as a speculative page address.

The physical page of the currently required data or instruction is not necessarily the physical page of the most recently requested data or instruction. For this reason, the speculative page address must always be checked against an accurate page address. However, related instructions tend to be clustered together in memory, and related data tend to be clustered together in memory. Further, to perform any given operation, a processor is generally required to execute a plurality of related instructions on a plurality of related data. Consequently, there tends to be a high correlation between the physical page of data requested and the physical page of data previously requested. Likewise, there tends to be a high correlation between the physical page of instructions requested and the physical page of instructions previously requested. The stronger these correlations, the more often the speculative address generated by speculative address generating unit 42 is accurate.

As can be seen from the foregoing, an apparatus and method are provided which reduce the average time required to retrieve information from a physical-address-indexed cache in a virtual memory system. The access time is reduced by initiating a preliminary search for the required information while the virtual address generated by the processor core is being converted to an accurate physical address. The preliminary search is based on a speculative address, which, in the preferred embodiment of the invention, is the physical address of the most recently retrieved information of the same type. Once an accurate physical address has been determined, it is compared with the speculative address. If the speculative and the actual addresses match, then the preliminary search is allowed to complete. If the speculative and the actual addresses do not match, the preliminary search is aborted and a search is begun based on the accurate physical address.

It is to be understood that the detailed drawings and specific examples given describe a preferred embodiment of the invention and are for the purpose of illustration only, and that the apparatus of the invention is not limited to the precise details and conditions disclosed. For example, while an internal virtual-address-indexed cache memory and an external physical-address-indexed cache memory have been described, these caches may be either internal or external In addition, while the present invention has been described with reference to a physical-address indexed cache, it may alternatively be used with any physical-address-indexed memory, such as system memory. Various other changes may also be made without departing from the spirit of the invention which is defined by the following claims.

What is claimed is:

1. An apparatus for use in a virtual memory system for reducing delay between generation of a virtual address by a processor core and transmission to a memory of a physical address corresponding to said virtual address, said generation of said virtual address by said processor core effecting a request for required information, the apparatus comprising:

a translation lookaside buffer operatively connected with said processor core and said memory and configured to receive said virtual address and to generate an accurate physical page address;

a speculative address generation unit operatively connected with said translation lookaside buffer and said memory for generating a speculative page address based only on another accurate physical page address generated by said translation lookaside buffer for a previous virtual address that corresponds to a previous request for required information output from said processor core, said speculative address generation unit transmitting said speculative page address to said memory prior to said translation lookaside buffer generating said accurate physical page address, said virtual address being generated after generation of said previous request for required information by said processor core, no other address requests to said memory being generated by said processor core in between generation of said virtual address and said previous request for required information;

and a comparator unit, operatively connected with said translation lookaside buffer, said memory and said speculative address generation unit, for comparing said accurate physical page address with said speculative page address;

said comparator unit transmitting said accurate physical page address received from said translation lookaside buffer directly to said memory in a transmission path from said comparator unit to said memory, said transmission path bypassing said speculative address generation unit, when said accurate physical page address does not match said speculative page address, wherein said memory is configured to initiate a first lookup operation based on said speculative page address substantially upon receipt of said speculative page address, said comparator unit being configured to transmit to said memory a control signal indicative of whether said speculative page address matches said accurate physical page address, said memory being configured to abort said first lookup operation based on said speculative page address and initiate a second lookup operation based on said accurate physical page address when said control signal indicates that said speculative page address does not match said accurate physical page address.

2. An apparatus for use in a virtual memory system as recited in claim 1 wherein said speculative address generation unit includes storage for storing a previous physical page address, said previous physical page address being a selected accurate physical page address previously generated by said translation lookaside buffer, at least a portion of said speculative page address being related with at least a portion of said previous physical page address according to a predetermined relationship.

3. An apparatus for use in a virtual memory system as recited in claim 2 wherein said virtual memory system includes a virtual-address-indexed cache memory operatively connected with said processor core, said virtual-address-indexed cache memory receiving said virtual address from said processor core and transmitting said required information to said processor core when said required information is present in said virtual-address-indexed cache memory.

4. An apparatus for use in a virtual memory system as recited in claim 1 wherein said generation of said virtual address by said processor core effects a present request for said required information, said present request being a present instruction request when said required information is an instruction, said present request being a present data request when said required information is data, said speculative address generation unit including an instruction storage area configured to store at least one previous instruction page address and a data storage area configured to store at least one previous data page address, said at least one previous instruction page address being a first selected accurate physical page address being a first selected accurate physical page address previously generated by said translation lookaside buffer, said at least one previous data page address being a second selected accurate previous physical page address previously generated by said translation lookaside buffer, at least a portion of said speculative page address being related with at least a portion of said at least one previous instruction page address according to a first predetermined relationship when said present request is said present instruction request, at least a portion of said speculative page address being related with a least a portion of said at least one previous data page address according to a second predetermined relationship when said present request is said present data request, said speculative address generation unit further including a multiplexer having a first input port connected to said instruction storage area and having a second input port connected to said data storage area, said multiplexer being configured to output said at least one previous instruction page address received from said first input port when said present request is said present instruction request, and said multiplexer being configured to output said at least one previous data page address received from said second input port when said present request is said present data request.

5. An apparatus for use in a virtual memory system as recited in claim 1 wherein said memory is a cache memory configured to supply said required information in response to said physical address.

6. An apparatus for use in a virtual memory system as recited in claim 5 wherein said speculative address generation unit is separate and distinct from said cache memory.

7. An apparatus for use in a virtual memory system as recited in claim 1, where in a case where the accurate physical page address is obtained prior to the memory outputting data based on the first lookup operation, said control signal causes the abort in which the memory does not output any data based on the first lookup operation.

8. An apparatus for reducing a time required for a processor core in a virtual memory system to retrieve information from a memory configured to supply information in response to a physical address, the apparatus comprising:

an accurate physical address generation unit, operatively connected with said processor core and said memory, for receiving a virtual address corresponding to an accurate physical page address and for generating said accurate physical page address;

a speculative address generation unit, operatively connected with said memory, for generating a speculative physical page address prior to said accurate physical address generation unit generating said accurate physical page address, said speculative physical page address being generated based only on a prior accurate physical page address generated by said accurate physical address generation unit based on a prior address request from said processor core, said speculative address generation unit transmitting said speculative physical page address to said memory to initiate a first lookup operation in said memory based on said speculative physical page address, said virtual address being generated after generation of said prior address request by said processor core with no other address requests to said memory being generated by said processor core in between generation of said virtual address and said prior address request; and a comparator unit operatively connected with said accurate physical address generation unit, said memory and said speculative address generation unit, for receiving said accurate physical page address from said accurate physical address generation unit and receiving said speculative physical page address from said speculative address generation unit, said comparator unit comparing said accurate physical page address with said speculative page address;

said comparator unit transmitting, when said accurate physical page address is different from said speculative physical page address, said accurate physical page address received from said accurate physical address generation unit directly to said memory on a transmission path from said comparator unit to said memory, the transmission path bypassing said speculative address generation unit, so as to initiate a second lookup operation based on said accurate physical page address, wherein said processor core generates said virtual address to effect a present request for said information, said present request being a present instruction request when said information is an instruction, said present request being a present data request when said information is data, said speculative address generation unit including previous page address storage configured to store at least one previous instruction page address and at least one previous data page address, said at least one previous instruction page address being an accurate physical page address previously generated by said accurate physical address generation unit, said at least one previous data page address being an accurate physical page address generated by said accurate physical address generation unit in response to said at least one previous data request, at least a portion of said speculative physical page address being related with at least a portion of said at least one previous instruction page address according to a first predetermined relationship when said present request is said present instruction request, at least a portion of said speculative physical page address being related with at least a portion of said at least one previous data page address according to a second predetermined relationship when said present request is said present data request.

9. An apparatus for reducing the time required for a processor core in a virtual memory system to retrieve information from a memory configured to supply information in response to a physical address, as recited in claim 8, wherein said memory is configured to initiate a first lookup operation based on said speculative physical page address substantially upon receipt of said speculative physical page address, said speculative address generation unit being configured to transmit a control signal to said memory, said control signal being indicative of whether said speculative physical page address matches said accurate physical page address, said memory being configured to abort said first lookup operation based on said speculative physical page address and initiate a second lookup operation based on said accurate physical page address when said control signal indicates that said speculative physical page address does not match said accurate physical page address.

10. An apparatus for reducing the time required for a processor core in a virtual memory system to retrieve information from a memory configured to supply information in response to a physical address, as recited in claim 8, wherein said speculative address generation unit is operatively connected with said accurate physical address generation unit, said speculative address generation unit including physical page address storage configured to store at least one previous physical page address, said at least one previous physical page address being a selected accurate physical page address previously generated by said accurate physical address generation unit, at least a portion of said speculative physical page address being related with a least a portion of said at least one previous physical page address according to a predetermined relationship.

11. An apparatus for reducing the time required for a processor core in a virtual memory system to retrieve information from a memory configured to supply information in response to a physical address, as recited in claim 10, wherein said virtual memory system includes a virtual-address-indexed cache memory operatively connected with said processor core, said processor core generating said virtual address to effect a request for required information, said virtual-address-indexed cache memory receiving said virtual address from said processor core, said virtual-address-indexed cache memory transmitting said required information to said processor core when said required information is present in said virtual-address-indexed cache memory.

12. An apparatus for use in a virtual memory system as recited in claim 11 wherein said speculative address generation unit is separate and distinct from said virtual-address-indexed cache memory.

13. A logical-to-physical address translation unit for transmitting a physical address over a bus in response to a virtual address comprising:

an accurate translation unit, for receiving said virtual address and translating said virtual address to an accurate physical page address;

a speculative translation unit operatively connected with said accurate translation unit, for generating a speculative physical page address based only on a translation of a prior virtual address received from a processor core into a prior accurate physical page address, said prior accurate physical page address being received from said accurate translation unit, said virtual address being generated after generation of said prior virtual address by said processor core with no other addresses being generated by said processor core to a memory in between generation of said prior virtual address and said virtual address;

a comparator unit operatively connected with said accurate translation unit, said speculative translation unit and said bus, for transmitting said speculative physical page address as said physical address over said bus prior to completion of said generation of said accurate physical page address, for comparing said accurate physical page address with said speculative physical page address, and for aborting transmission of said speculative physical page address over said bus and initiating transmission of said accurate physical page address received from said accurate translation unit and transmitted directly to said memory from said comparator unit on a transmission path when said accurate physical page address does not match said speculative physical page address, the transmission path from said comparator unit to said memory bypassing said speculative translation unit, wherein said processor core generates said virtual address to effect a present request for said information, said present request being a present instruction request when said information is an instruction, said present request being a present data request when said information is data, said speculative translation unit including previous page address storage configured to store at least one previous instruction page address and at least one previous data page address, said at least one previous instruction page address being an accurate physical page address previously generated by said accurate translation unit, said at least one previous data page address being an accurate physical page address generated by said accurate translation unit in response to said at least one previous data request, at least a portion of said speculative physical page address being related with at least a portion of said at least one previous instruction page address according to a first predetermined relationship when said present request is said present instruction request, at least a portion of said speculative physical page address being related with at least a portion of said at least one previous data page address according to a second predetermined relationship when said present request is said present data request.

14. A logical-to-physical address translation unit for transmitting a physical address in response to a virtual address, as recited in claim 13, further comprising a memory operatively connected with said bus, said memory being configured to initiate a first lookup operation based on said speculative physical page address substantially upon receipt of said speculative physical page address over said bus, said speculative translation unit being configured to transmit a control signal to said memory, said control signal being indicative of whether said speculative physical page address matches said accurate physical page address, said memory being configured to abort said first lookup operation based on said speculative physical page address and initiate a second lookup operation based on said accurate physical page address when said control signal indicates that said speculative physical page address does not match said accurate physical page address.

15. A logical-to-physical address translation unit for transmitting a physical address in response to a virtual address, as recited in claim 13, wherein said accurate translation unit is a translation lookaside buffer.

16. A logical-to-physical address translation unit for transmitting a physical address in response to a virtual address, as recited in claim 13, wherein said virtual address comprises a virtual page portion and an offset portion, and wherein said accurate translation unit is configured to generate said accurate physical page address in response to said virtual page portion, and wherein an accurate physical address comprises said accurate physical page address and said offset portion, and wherein a speculative physical address comprises said speculative physical page address and said offset portion.

17. A logical-to-physical address translation unit for transmitting a physical address in response to a virtual address, as recited in claim 13, wherein said speculative translation unit includes, previous page address storage configured to store at least one previous physical page address, said at least one previous physical page address being a selected accurate physical page address previously generated by said accurate translation unit at least a portion of said speculative physical page address being related with said at least one previous physical page address according to a predetermined relationship.

18. A virtual memory system, including:

a processor core disposed to generate a virtual address representative of required information; a first cache disposed to supply information in response to virtual addresses, said first cache being operatively connected with said processor core for receiving said virtual address from said processor core said, first cache including a first plurality of storage locations for storing information, said first cache transmitting said required information to said processor core in response to receipt of said virtual address when said required information resides in said first plurality of storage locations;

a logical-to-physical address translation unit, operatively connected with said processor core, for receiving said virtual address, for generating a physical address in response to said virtual address, and for transmitting said physical address; and a second cache disposed to supply information in response to physical addresses, said second cache being operatively connected with said logical-to-physical address translation unit and to said processor core, for receiving said physical address from logical-to-physical address translation unit, said second cache including a second plurality of storage locations for storing information, said second cache initiating a lookup operation for said required information in response to receipt of said physical address, said second cache transmitting said required information to said processor core when said required information resides in said second plurality of storage locations;

said logical-to-physical address translation means including:

an accurate translation unit for receiving said virtual address and for generating an accurate physical page address from said virtual address, a speculative translation unit, operatively connected with said accurate translation unit, for generating a speculative physical page address, a comparator unit operatively connected with said accurate translation unit, said speculative translation unit and said second cache, for transmitting said speculative physical page address as a portion of said physical address to said second cache prior to completion of said generation of said accurate physical page address, for comparing said accurate physical page address to said speculative physical page address, and for aborting transmission of said speculative physical page address to said second cache and initiating transmission of said accurate physical page address to said second cache when said accurate physical page address does not match said speculative physical page address.

19. A virtual memory system, as recited in claim 18, wherein said second cache is configured to initiate a first lookup operation based on said speculative physical page address substantially upon receipt of said speculative physical page address, said speculative translation unit being configured to transmit a control signal to said second cache, said control signal being indicative of whether said speculative physical page address matches said accurate physical page address, said second cache being configured to abort said first lookup operation based on said speculative physical page address and initiate a second lookup operation based on said accurate physical page address when said control signal indicates that said speculative physical page address does not match said accurate physical page address.

20. A virtual memory system, as recited in of claim 18, wherein said accurate translation unit is a translation lookaside buffer.

21. A virtual memory system, as recited in claim 18, wherein said virtual address comprises a virtual page portion and an offset portion, and wherein said accurate translation unit is configured to generate said accurate physical page address in response to receiving said virtual page portion, and wherein an accurate physical address comprises said accurate physical page address and said offset portion, and wherein a speculative physical address comprises said speculative physical page address and said offset portion.

22. A virtual memory system, as recited in claim 18, wherein said speculative translation unit includes previous page address storage configured to store at least one previous physical page address, said at least one previous physical page address being a selected accurate physical page address previously generated by said accurate translation unit, at least a portion of said speculative physical page address being related with at least a portion of said at least one previous physical page address according to a predetermined relationship.

23. A virtual memory system, as recited in claim 18, wherein said generation of said virtual address by said processor core effects a present request for said required information, said present request being a present instruction request when said required information is an instruction, said present request being a present data request when said required information is data, said speculative translation unit including previous page address storage configured to store at least one previous instruction page address and at least one previous data page address, said at least one previous instruction page address being a first selected accurate physical page address previously generated by said accurate translation unit, said at least one previous data page address being a second selected accurate physical page address previously generated by said accurate translation unit, at least a portion of said speculative physical page address being related with at least a portion of said at least one previous instruction page address according to a first predetermined relationship when said present request is said present instruction request, at least a portion of said speculative physical page address being related with at least a portion of said at least one previous data page address according to a second predetermined relationship when said present request is said present data request.

24. A virtual memory system, as recited in claim 18, wherein said processor core, said logical-to-physical address translation unit, and said first cache reside on a single processor chip.

25. A virtual memory system, as recited in claim 24, wherein said second cache resides external to said single processor chip.

26. A method for converting a first virtual address to a physical address in a system including a processor core configured to generate said first virtual address to request required information from a memory, said processor core having generated a second virtual address prior to generation of said first virtual address, with no other virtual addresses being generated for access to said memory by said processor core in between generation of said first virtual address and said second virtual address, comprising the steps of:
  initiating a conversion operation to convert a virtual page portion of said first virtual address to an accurate physical page address;
  generating a speculative physical page address based only on a prior conversion of said virtual page portion of said second virtual address to a prior accurate physical page address;
  transmitting said speculative physical page address to said memory prior to completion of said conversion operation;
  comparing, by a comparator, said accurate physical page address to said speculative physical page address;
  and terminating said transmission of said speculative physical page address to said memory, and initiating transmission of said accurate physical page address to said memory, when said accurate physical page address does not match said speculative physical page address, said initiating transmission being performed by said comparator directly sending said accurate physical page address to said memory on a transmission path, without any other components being coupled to the transmission path between said comparator and said memory.

27. A method for converting a virtual address to a physical address in a system including a processor core configured to generate said virtual address to request required information form a memory, as recited in claim 26, including the further steps of causing said memory to initiate a first lookup operation based on said speculative physical page address substantially upon receipt of said speculative physical page address, and causing said memory to abort said first lookup operation based on said speculative physical page address and initiate a second lookup operation based on said accurate physical page address when said speculative physical page address does not match said accurate physical page address.

28. A method for converting a virtual address to a physical address in a system including a processor core configured to generate said virtual address to request required information from a memory, as recited in claim 26, wherein said conversion operation is performed by a lookaside translation buffer.

29. A method for converting a virtual address to a physical address in a system including a processor core configured to generate said virtual address to request required information from a memory, as recited in claim 26, wherein said virtual address has a virtual page portion and an offset portion, said conversion operation including converting said virtual page portion to said accurate physical page address.

30. A method for converting a virtual address to a physical address in a system including a processor core configured to generate said virtual address to request required information from a memory, as recited in claim 29, wherein said step of transmitting said speculative physical address further includes transmitting said offset portion to said memory.

31. A method for converting a virtual address to a physical address in a system including a processor core configured to generate said virtual address to request required information from a memory, as recited in claim 30, wherein said step of initiating transmission of said accurate physical page address further includes initiating transmission of said offset portion.

32. A method for converting a virtual address to a physical address in a system including a processor core configured to generate said virtual address to request required information from a memory, as recited in claim 26, wherein said processor core further generates a status signal representative of whether said required information represents an instruction or data, the method further including the step of receiving said status signal, said generation of said speculative physical page address being responsive to said status signal.

33. A method for converting a virtual address to a physical address in a system including a processor core configured to generate said virtual address to request required information from a memory, as recited in claim 32, wherein said generation of said speculative physical page address is further responsive to a previously-generated accurate physical page address.

34. A method for converting a virtual address to a physical address in a system including a processor core configured to generate said virtual address to request required information from a memory, as recited in claim 33, said virtual address effecting a present request for said required information, said present request being a present data request when said required information is data, said present request being a present instruction request when said requested information is an instruction, wherein said step of generating said speculative physical page address includes the steps of:

storing a first previously-generated accurate physical page address, said first previously-generated accurate physical page address being a first selected accurate physical page address generated previous to said accurate physical page address in response to a previous data request;

storing a second previously-generated accurate physical page address, said second previously-generated accurate physical page address being a second selected accurate physical page address generated previous to said accurate physical page address in response to a previous instruction request;

generating said first previously-generated accurate physical page address when said status signal indicates said required information represents data; and generating said second previously-generated accurate physical page address when said status signal indicates said required information represents an instruction.

* * * * *